United States Patent
Maucksch (10) Patent No.: US 7,809,051 B2
(45) Date of Patent: Oct. 5, 2010

(54) METHOD TO PERFORM A STATISTICAL TEST IN WHICH THE EXPERIMENT IS MULTINOMIAL

(75) Inventor: Thomas Maucksch, Tuntenhausen (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 692 days.

(21) Appl. No.: 11/659,679

(22) PCT Filed: Jun. 17, 2005

(86) PCT No.: PCT/EP2005/006568

§ 371 (c)(1),
(2), (4) Date: Sep. 12, 2007

(87) PCT Pub. No.: WO2006/015653

PCT Pub. Date: Feb. 16, 2006

(65) Prior Publication Data

US 2008/0075155 A1  Mar. 27, 2008

(30) Foreign Application Priority Data

Aug. 10, 2004  (EP) .................................. 04018940

(51) Int. Cl.
*H04N 7/12* (2006.01)
*H04B 3/46* (2006.01)

(52) U.S. Cl. .................. 375/224; 375/225; 375/240.26; 375/240.27

(58) Field of Classification Search .................. 375/224, 375/227, 240.26–240.29, 296, 346, 225; 370/333, 332; 455/63.1, 67.11, 67.13, 67.14, 455/226.1, 296

See application file for complete search history.

(56) References Cited

U.S. PATENT DOCUMENTS

| 2002/0116154 A1 | 8/2002 | Nowak et al. |
| 2003/0065989 A1* | 4/2003 | Yedida et al. ................ 714/703 |
| 2003/0108010 A1* | 6/2003 | Kim et al. .................... 370/333 |

FOREIGN PATENT DOCUMENTS

WO  WO 02/089390 A1  11/2002

OTHER PUBLICATIONS

E.J. Dudewicz et al. "Modern Mathematical Statistics," John Wiley and Sons, NY, 1988, document XP-002317443.
First Notice (Form PCT/IB/308) for PCT/EP2005/006568 dated Mar. 16, 2006.
International Search Report for PCT/EP2005/006568 dated Aug. 11, 2005.
International Preliminary Report on Patentability for PCT/EP2005/006568 dated Feb. 13, 2007.

* cited by examiner

*Primary Examiner*—David C Payne
*Assistant Examiner*—Linda Wong
(74) *Attorney, Agent, or Firm*—Marshall, Gerstein & Borun LLP (57) ABSTRACT

A method for performing a statistical test on a device or radio channel, which has N outcomes in the form of N different events, whereby N is higher than two, with the following steps:
measuring ns samples of the output of the device or radio channel under test, whereby occurs a specific number (na,nb,ne) of each event,
defining a specific limit (L) for the test in a space spanned out by specific numbers of each event,
erecting a N−1 dimensional likelihood distribution on several points of the limit (L), and
constructing a threshold for fail of the radio channel or device and a threshold for pass of the radio channel or device by summing or integrating the N−1 dimensional likelihood distribution along unbroken paths parallel to the limit L until a predefined confidence level is reached.

9 Claims, 5 Drawing Sheets

METHOD TO PERFORM A STATISTICAL TEST IN WHICH THE EXPERIMENT IS MULTINOMIAL

BACKGROUND OF THE INVENTION

1. Field of the Invention

The invention relates to a method of performing a statistical test on a device or radio channel.

2. Related Technology

From WO 02/089390 A1 a test method to decide pass or fail over statistical tests is known. The applicability however is restricted. The elementary step has two outcomes: bit error/correct bit or lost packet/received packet or limit violated/limit met.

Figure 1:
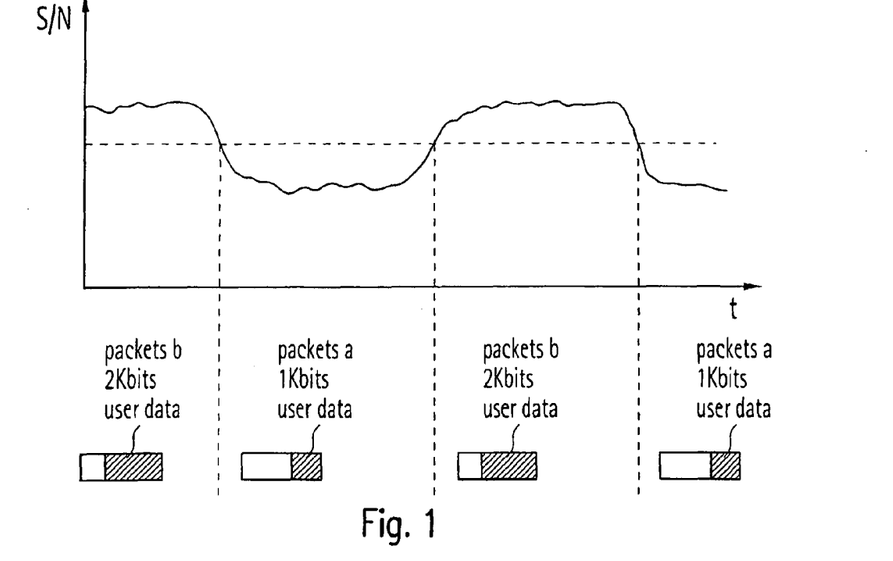
FIG. 1 shows the signal/noise ratio of a radio channel and the associated packets a and b.

The following is an example of an application, where this test cannot be applied. In HSDPA (High Speed Downlink Packet Access) data packets are transmitted from the base station to the mobile station. The signal/noise ratio S/N is varying as function of time as shown in FIG. 1. The user-data throughput shall exceed a specified limit. The packets are transmitted equally spaced in time. Due to the mobile radio channel a portion of the packets can be received correctly, another portion is lost. As the lost packets occur irregularly, throughput is a statistical parameter under test. If the packets all carry the same quantity of user bits, the user-data-throughput can be statistically treated with the state of the art statistical approach. However, in HSDPA the user data in the packets have different quantities. For example packets b with 2 kbits user data are used in periods with high channel quality (high S/N) and packets a with only 1 kbits user data are used in periods with poor channel quality (low S/N) as shown in FIG. 1. The different packets a and b are received, or get lost, irregularly according to the irregular radio channel. Therefore the state of the art approach is not applicable, as the possible outcomes with respect to user data are multiple.

SUMMARY OF THE INVENTION

Thus, the invention provides a method to extend the statistical test onto devices or radio channels with more than two outcomes.

The inventive method for performing a statistical test on a device or radio channel, which has N outcomes in the form of N different events, whereby N is higher than two, includes the following steps:

- measuring ns samples of the output of the device or radio channel under test, whereby occurs a specific number, e.g. na,nb, of each event,
- defining a specific limit L for the test in a space spanned out by specific numbers of each event,
- erecting a N−1 dimensional likelihood distribution on several points of the limit L, and
- constructing a threshold Tf for fail of the radio channel or device and a threshold Tp for pass of the radio channel or device by summing or integrating the N−1 dimensional likelihood distribution along unbroken paths parallel to the limit L until a predefined confidence level F is reached.

Preferably the N−1 dimensional likelihood distribution is the N−1 dimensional binomial distribution.

For example packets with N−1 different data quantities are transmitted through the device or radio channel and N−1 events are the reception of a packet with a specific one of the different data quantities and the $N^{th}$ event is the loss of a packet.

The summing or integrating is preferably started from the origin.

BRIEF DESCRIPTION OF THE DRAWINGS

The invention is now explained with respect to the drawings, in which.

DETAILED DESCRIPTION

The following description provides an extract of the state of the art statistical approach with two outcomes in order to facilitate the understanding of the inventive method followed by the inventive extended statistical approach with three outcomes and the statistical approach with four outcomes. It should be possible, to generalize to n outcomes.

First a statistical approach for an experiment with two outcomes according to state of the art is discussed. We consider a throughput test with constant quantity of user data in the packets. The nomenclature is as follows: ns is the number of samples; a sample is a packet, which has been sent. It may be lost or correctly received. ne is the number of events; an event is a correctly received packet. R is the true ratio of correct packets/all packets. It is a characteristic of the device under test. It is unknown to us during finite test time. L is the specified limit for R.

This statistical approach is applicable, if R is time independent and an event is independent from the previous one, i.e. it is memory-less.

Then the binomial distribution can be applied according to formula (1):

$$p(ne) = \binom{ns}{ne}(R)^{ne}(1-R)^{ns-ne} \quad (1)$$

with $$\binom{ns}{ne} = \frac{ns!}{ne! * (ns-ne)!} \quad (2)$$

wherein ne is the variable in the range of $0 \leq ne \leq ns$. R and ns are parameters. p(ne) is the probability to find ne events in ns samples in a test object with true ratio R.

It should be noted that 1.1) $ne + \overline{ne} = ns$                  (3)

number of events+number of not-events (lost packets)=number of samples.

1.2) $p(R=1)=1$ for $ne=ns$            (4)

$p(R=1)=0$ for all other ne

This describes a degenerated distribution.

1.3) $p(R=0)=1$ for $ne=0$ (5)

$P(R=0)=0$ for all other ne

This again describes a degenerated distribution. This is a characteristic of the binomial distribution as $0!=1$.

The target is to predict a certain number of events nep in ns, which, when actually measured, allows the following statement: The true R is equal or better than the limit L with a probability of F % (e.g. 95%). If the limit is reached, we decide pass. nep is the number of event for pass. F is called "confidence level". The compliment (1-F) is called "wrong decision risk". We want to predict another number of events nef in ns, which, when actually measured, allows the following statement: The true R is worse than the limit L with a probability of F %. If this is actually measured, we decide fail. nef is the number of event for fail. We can find those nep and nef by putting up the binomial distribution with true R on the limit L for ns samples with the variable ne. The sum over ne from 0 to nef shall be for example 5%, which is 1-F. This determines nef. The sum over ne from nep to ns shall be for example 5%. This determines nep. Or, which is the same: the sum over ne from 0 to nep shall be 95%. This determines nep. This is called "inverse cumulative operation".

nep is the pass limit. If nep or more is measured in ns samples, we decide pass. nef is the fail limit. If nef or less is measured in ns samples, we decide fail. If the measurement is in between nep and nef in ns samples, we cannot decide with the desired confidence level F. Such pass and fail thresholds can be calculated for short tests, for which ns is low, and long tests, for which ns is high. Those thresholds approach the limit L the closer, the longer the test is, however never touch the limit.

Even if the pass and fail threshold can be calculated for short and long tests, it is only allowed to apply it at just one instant of the test, predefined by ns. The length of the test must be planned in advance. Depending on the true R a possible outcome of a test may be undecided. In order to avoid this, a looser limit LL is established, with LL<L. We want to make the fail decision based on L and we want to make the pass decision based on LL. The fail limit remains unchanged and approaches L for longer tests. The looser pass limit approaches LL for longer tests. This way the fail limit, based on L, and the pass limit, based on LL, intersect at a certain ns=nsInt. If the test is planned to last nsInt samples, an undecided is not any more possible.

A pass means: the true R is better than LL with 95% confidence level in this example. A fail means: the true R is worse than L with 95% confidence level in this example.

Now an inventive embodiment of a statistical approach for an experiment with three outcomes is explained. A throughput test with two quantities of user data a and b (a<b) in the packets and lost packets considered. The nomenclature is as follows: ns is the number of samples; a sample is a packet, which has been sent. It may be lost or correctly received. na is the number of events a. An event a is a correctly received packet with quantity a. nb is the number of events b. An event b is a correctly received packet with quantity b. Ra is the true ratio of correct packets with quantity a/all packets. It is unknown to us. Rb is the true ratio of correct packets with quantity b/all packets. It is also unknown to us.

A generalization can be made: ne expands into a vector with the components (na,nb) with ne=na+nb. R expands into a vector with the components (Ra,Rb).

T is the throughput. In contrast to the statistical approach with two outcomes, it is necessary to assign quantities to the events a and b. E.g. packet a carries 1 kbit user data and packet b carries 2 kbit user data.

Each packet comprises several bits (e.g. 1 kbit or 2 kbits). In the statistical approach with 2 outcomes, throughput could be understood as packets, received/packets, sent, or as user bits, received/user bits, sent.

Only the second alternative is meaningful for the statistical approach with more than two outcomes. The throughput T should be defined as user bits, received/user bits, sent, with any combination of na and nb. L is the specified limit for T.

Figure 2:
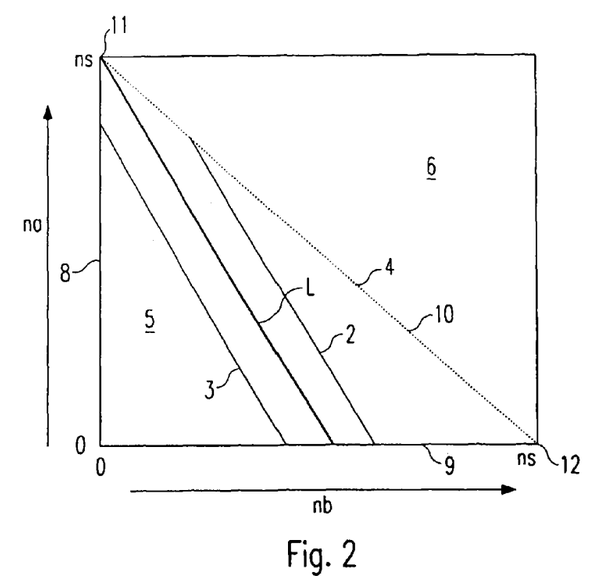
FIG. 2 shows possible combinations of number of events na and nb.

This is illustrated in FIG. 2. In the example of FIG. 2 packet a carries 1 kbit and packet b carries 2 kbit user data. The specified limit L shall be 1 kbit in average. This is fulfilled at every point of the line L. A tighter limit is a straight line 2 parallel to the limit L apart from the origin. A looser limit is a straight line 3 parallel to the limit L towards the origin. The limits 2, 3 and 4 in FIG. 2 have a common gradient: −2/1. The gradient is determined by the ratio of packet quantity b/packet quantity a.

The straight dotted line 4 from na=ns to nb=ns separates the valid area 5 towards the origin from the invalid area 6 apart from the origin.

The statistical approach is applicable, if the vector R=(Ra,Rb) is time independent and each event (na,nb) is independent from the previous one, i.e. it is memoryless and the events a and b are assigned to quantities.

Then the two-dimensional binomial distribution can be applied by $$p(na, nb) = \frac{ns!}{na! * nb! * (ns-na-nb)!} * Ra^{na} * Rb^{nb} * (1 - Ra - Rb)^{(ns-na-nb)} \quad (6)$$

or, which is the same by $$p(na, nb) = \binom{ns}{na} Ra^{na} * \binom{ns-na}{nb} Rb^{nb} * (1 - Ra - Rb)^{(ns-na-nb)} \quad (7)$$

wherein (na,nb) is the vector-variable in the range of $0 \leq na \leq ns$, $0 \leq nb \leq ns$, (Ra,Rb) is a vector-parameter, ns is a scalar parameter and p(na,nb) is the probability to find the event-vector ne=(na, nb) in ns samples in a test object with true ratio R=(Ra,Rb).

It should be noted that 2.1) $na+nb+ne=ns$ (8)

number of events a+number of events b+number of not-events (lost packets)=number of samples Six areas are distinguished in FIG. 2 comprising one plane, three lines and two points:

2.2) valid area 7 (without boarder): Any point in the plane 5 can carry a vector (R or L or ne) with two components. Those two components are used to describe a statistics with three outcomes. The third outcome (lost packets) is not independent because of note 2.1 above.

2.3) left boarder (without end points): On this line 8 one component of the vector, i.e. the b-component, is not random, but deterministic, and equals 0. The statistics degenerates into a statistics with two outcomes, na and n̶a̶, where n̶a̶is not independent because of Note 1.1 above.

2.4) lower boarder (without end points): On this line one component of the vector (the a-component) is not random, but deterministic, and equals 0. The statistics degenerates into a statistics with two outcomes, nb and n̶b̶, where n̶b̶is not independent.

2.5) boarder 10 from na=ns to nb=ns (without end points): On this line 10 the number of lost packets n̶e̶is not random, but deterministic and equals 0. The statistics degenerates into a statistics with two outcomes, na and nb, where nb is not independent. It is nb=n̶a̶.

2.6) na=ns: On this point 11 nb and the number of lost packets n̶e̶are not random variables but deterministic and equals 0. The entire statistics degenerates into deterministics.

2.7) nb=ns: On this point 12 nb and the number of lost packets n̶e̶are not random variables but deterministic and equals 0. The entire statistics degenerates into deterministics.

The target is to predict a certain throughput-threshold Tp in an experiment of ns samples, which, when hit by a real measurement, allows the following statement: The device under test is equal or better than the limit L with a probability of F, e.g. 95%. If actually measured we decide pass. Tp is the Throughput for pass. We want to predict another threshold Tf in an experiment of ns samples, which, when hit by a real measurement, allows the following statement: The device under test is worse than the limit L with a probability of F. If actually measured we decide fail. Tf is the Throughput for fail.

Figure 3:
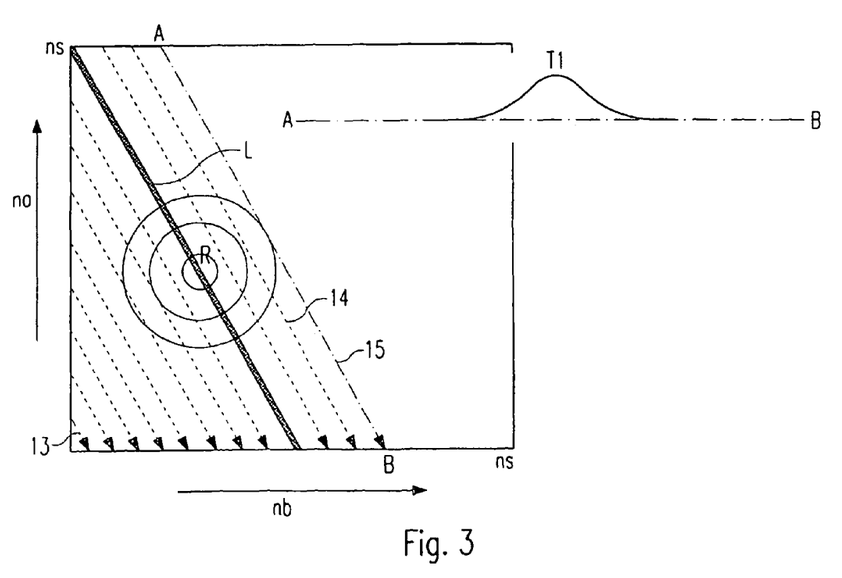
FIG. 3 shows the adequate direction of summation.

Those Tp and Tf can be found applying a series of two dimensional binomial distributions with true R on every point of the limit L. We now describe, how to find one point of Tp. A two-dimensional binomial distribution is erected onto one point of the limit L. The true ratio R=(Ra,Rb) is the center of the closed curves in FIG. 3. In the one-dimensional case a sum is performed along the ne variable. The sum over ne from 0 to nep shall be 95% in the example. This determines nep. This way, in the examples 95% of the distribution is separated from the other 5% of the distribution. The separation point nep was the result. In the two-dimensional case it is desired to separate 95% in the example from the distribution from the other 5% of the distribution. However, in the two dimensional case there are infinite possibilities to sum:

$$P(na, nb) = 95\% = \sum_{i=0}^{nap} \sum_{j=0}^{nb=ns} p(na_i, nb_j) \quad (9)$$

with nap as result or $$P(na, nb) = 95\% = \sum_{j=0}^{nbp} \sum_{i=0}^{na=ns} p(na_i, nb_j) \quad (10)$$

with nbp as result.

Both are not suitable for the problem. FIG. 3 shows the adequate direction of summation.

One possibility is to start at the origin and to sum along straight lines following arrows 13 parallel to the limit L. There is a last line 14 finalised with a sum below 95% in this example. The next line following arrow 15 ends up with a sum above 95%. We now discuss this line 15. Among the probability values along this line A-B there is a maximum. This is the wanted point on Tp. There is no preference of the summation direction within the line. As we have a discrete distribution, the straight lines are in reality straight staircaselines. In general there are several exclusive sets of straight stair case lines. They are interlaced. The procedure, as described, is the two dimensional equivalent of the well known inverse cumulative operation.

The other points of Tp are constructed accordingly by selecting other vectors R on the limit L. In practice it is sufficient to construct a few points Tp and interpolate by a suitable method. The points of Tf are constructed accordingly.

Figure 4:
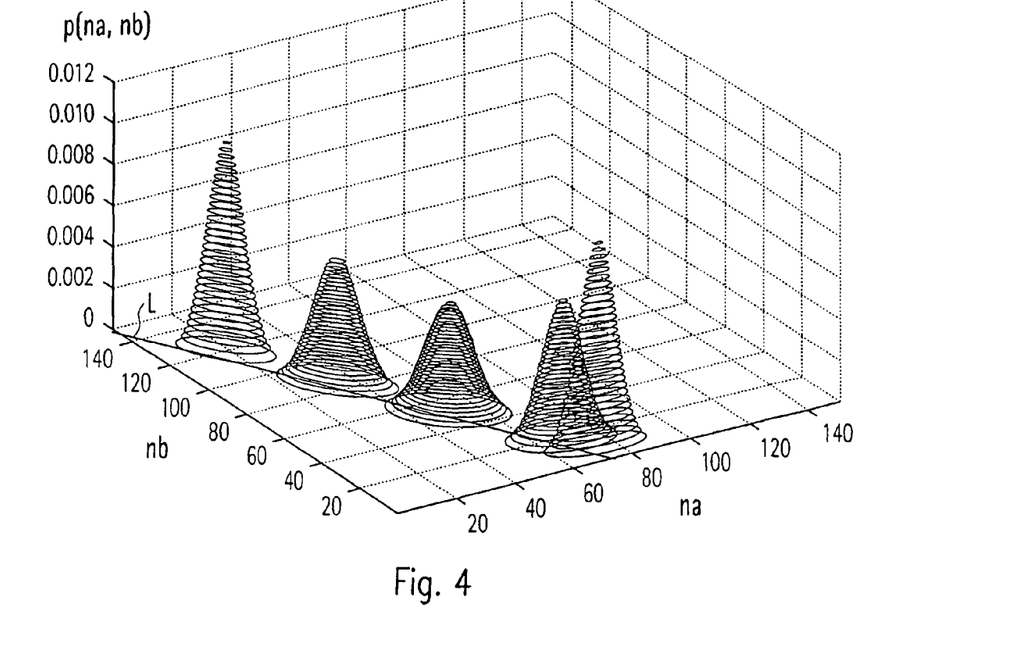
FIG. 4 shows examples of the distributions.

For better illustration FIG. 4 shows a three-dimensional plot of FIG. 3 with the probability p(na, nb) as a function of na and nb for different vectors R.

Figure 5:
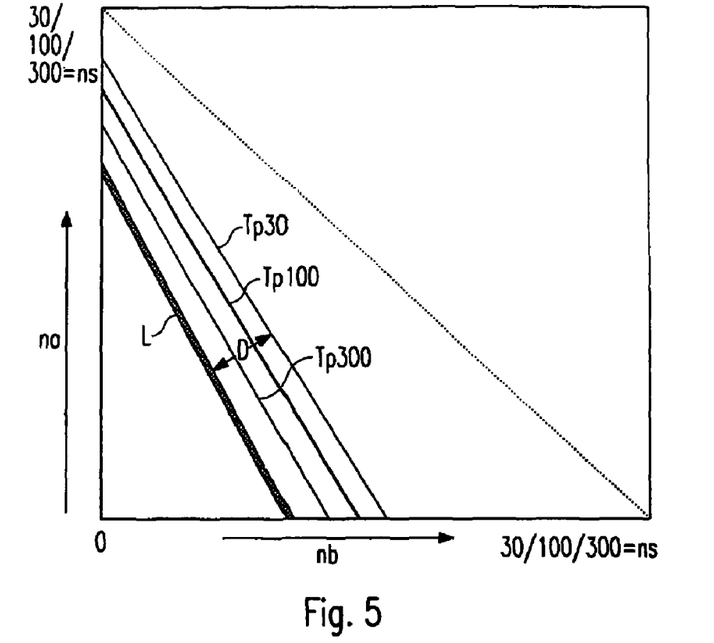
FIG. 5 shows different thresholds with respect to the limit.

The result is discussed with reference to FIG. 5. The bold straight line L is the limit. The curve Tp30 is a pass threshold for a short test, e.g. ns comprises 30 samples. The curve Tp100 is a pass threshold for a medium test, e.g. ns comprises 100 samples. The curve Tp300 is a pass threshold for a long test, e.g. ns comprises 300 samples.

Tp are curves exclusively on one side of the limit, apart from the origin. For ns approaching infinity they approach the limit L. The curves are for a $1^{st}$ approximation straight lines approximately parallel to the limit L and for a $2^{nd}$ approximation straight lines not parallel to the limit L. They are farther from the limit L, where Ra or Rb is nearer to ns/2. In a $3^{rd}$ approximation the curves are not straight. Compared to the experiment with two outcomes the distance D of Tp to L is smaller everywhere on the curves. Tf is exclusively on the other side of the limit L towards the origin. Otherwise it has the same properties.

Figure 6:
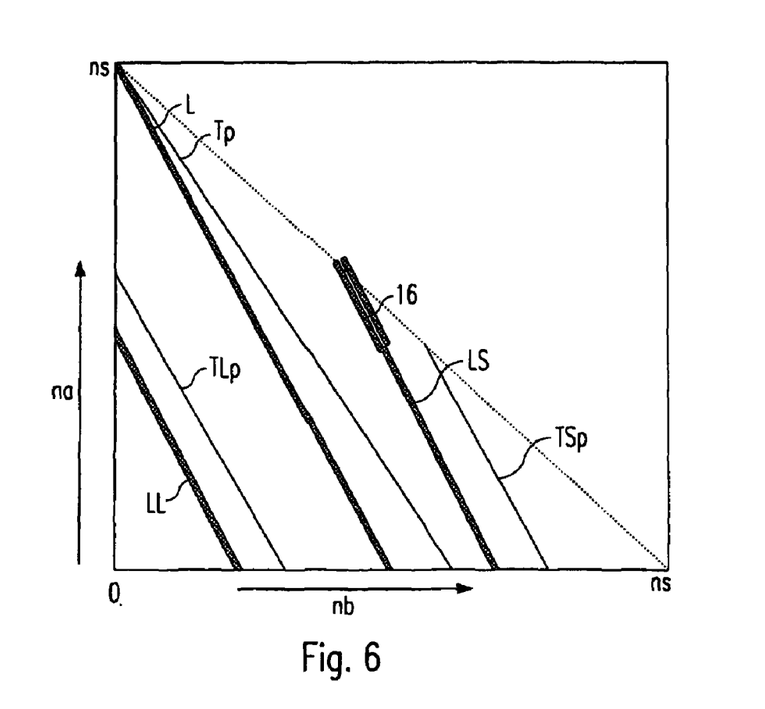
FIG. 6 shows different limits and respective thresholds.

Some special cases are now discussed with respect to FIG. 6.

In FIG. 6 a looser limit LL with the corresponding pass threshold TLp is shown. The TLp point on the nb axis can be calculated from the statistics with two outcomes, nb and n̶b̶, see note 2.4. The TLp point on the na axis can be calculated from the statistics with two outcomes, na and n̶a̶, see note 2.3. In FIG. 6 a limit L which ends in na=ns is shown. Any distribution around this point approaches towards a single impulse, see note 2.6. Therefore the pass threshold Tp approaches the limit L in this point. Further a stricter limit LS with the corresponding pass threshold TSp is shown. There is a short range 16 on this limit, where it is not possible to find a pass threshold with the wanted confidence level F. This effect has no equivalent in the statistics with two outcomes.

Tp is the pass limit; if a point on Tp or apart from the origin is measured in ns samples we decide pass. Tf is the fail limit; if a point on Tf or towards the origin is measured in ns samples we decide fail. If the measurement is in between Tp and Tf in ns samples, we cannot decide with the desired confidence level F.

Such pass and fail thresholds can be calculated for short tests (ns low) and long tests (ns high). Those thresholds approach the limit L the closer, the longer the test is, however never touch the limit completely. Even if the pass and fail threshold can be calculated for short and long tests, it is only allowed to apply it at just one instant of the test, predefined by ns. This ns must be planned in advance to the test. Depending on the true R a possible outcome of a test may be undecided. In order to avoid this, a looser limit LL is established, e.g. LL<L. (< here means parallel towards the origin). The fail limit Tf remains unchanged and approaches L for increasing test time. The looser pass limit TLp approaches LL for increasing test time. This way the fail limit Tf and the looser pass limit TLp intersect for a certain test time.

Using the $1^{st}$ approximation they intersect at a certain ns=nsInt. If the test is planned to last nsInt samples, an undecided result is not any more possible. Using the $2^{nd}$ or higher approximations the intersection is a line in the na-nb-ns space.

Figure 7:
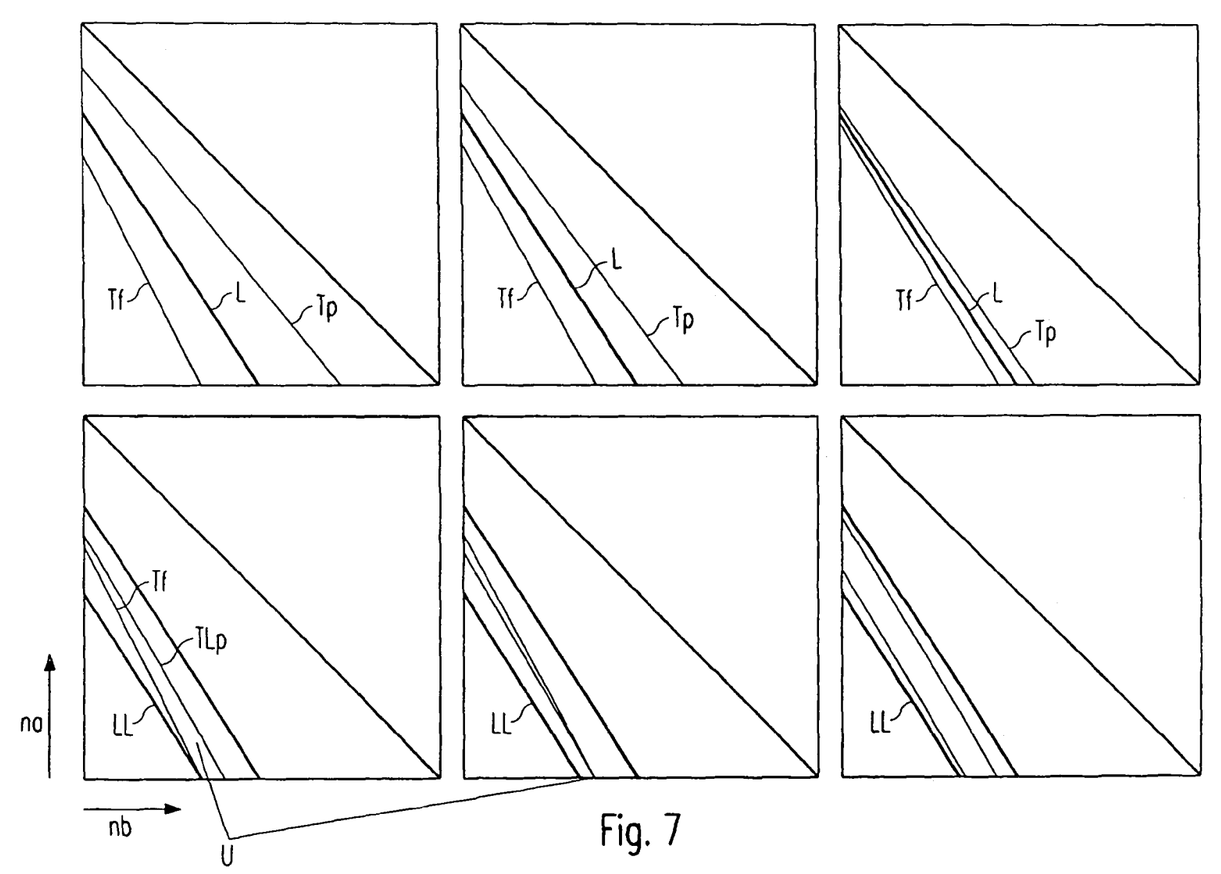
FIG. 7 shows the limits and thresholds for different test times.

Three areas of ns are distinguished. This is illustrated in FIG. 7 as the bottom row. In a short test the undecided-region U in the na-nb-plane divides the pass- and the fail-region completely. In a middle test, the undecided-region U in the na-nb-plane divides the pass- and the fail-region partly. Otherwise the pass and fail region overlap. In a long test, there is no undecided-region. The first of those ns is called nsT. If the test is planned to last nsT samples, an undecided result is not any more possible. It is the shortest test time excluding an undecided result.

A pass means that the true T is better than LL with 95% confidence level in the example. A fail means that the true T is worse than L with 95% confidence level in the example.

In FIG. 7 all axis are horizontal for nb form 0 to ns, and vertical for na from 0 to ns. L is the original limit. Tp is the pass limit and Tf is the fail limit. From the left to the right the test time ns is increased. Imagine three ns layers in the na, nb, ns space. Therefore the pass fail limits Tp and Tf approach towards L. If we measure a vector between Tp and Tf, the test is undecided. Even for long tests an undecided result is not unavoidable, see first row in FIG. 7.

In order to avoid an undecided result, the original limit L is only used to derive the fail limit Tf. A looser limit LL is introduced to derive looser pass limit TLp. This is illustrated in the second row of FIG. 7. Also in this row, we increase the test time from the left to the right. For a short test there is still an undecided-region U. For a middle long test the undecided region U is about to vanish. For a long test an undecided result is not anymore possible.

Now an inventive embodiment of a statistical approach for an experiment with four outcomes is discussed with respect to the inventive method. A throughput test with three quantities of user data a, b, c (a<b<c) in the packets and lost packets is considered. The nomenclature is as follows: ns is the number of samples. A sample is a packet, sent. It may be lost or correctly received. na is the number of events a. An event a is a correctly received packet with quantity a. nb is the number of events b. An event b is a correctly received packet with quantity b. nc is the number of events c. An event c is a correctly received packet with quantity c. Ra is the true ratio of correct packets with quantity a/all packets. It is unknown. Rb is the true ratio of correct packets with quantity b/all packets. It is also unknown. Rc is the true ratio of correct packets with quantity c/all packets. It is also unknown.

The following generalisation can be made: ne expands into a vector with the components (na,nb,nc) with ne=na+nb+nc. R expands into a vector with the components (Ra,Rb,Rc).

Figure 8:
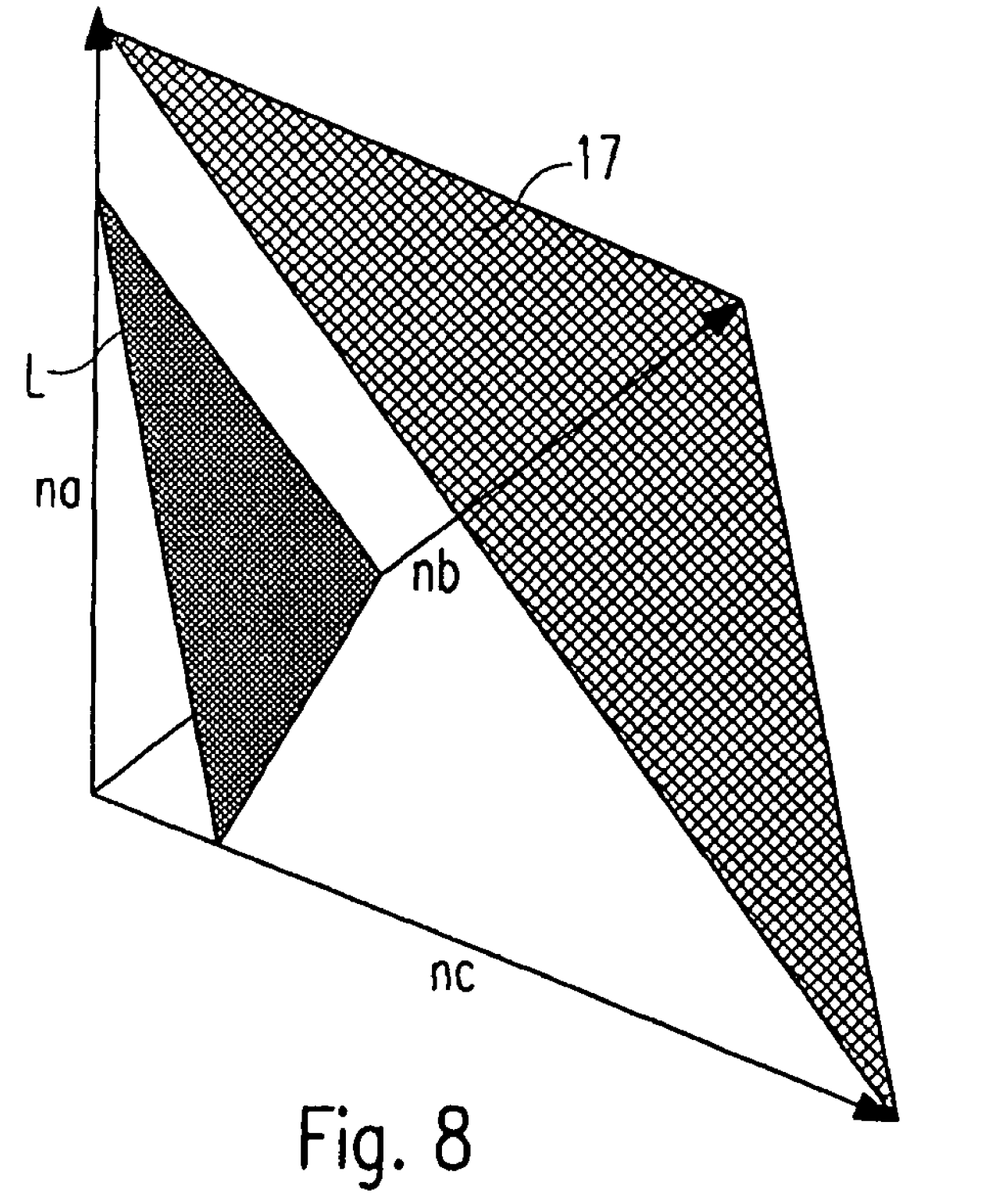
FIG. 8 shows the limit of a test with three outcomes.

T is the throughput and defined as user bits, received/user bits, sent, by any combination of na, nb and nc. L is the specified limit for T. This is illustrated in FIG. 8.

The limit L is an even plane. A tighter limit LT is a even plane parallel to L apart from the origin. A looser limit LL is an even plane parallel to L towards the origin. The even plane 17 spread out between na=ns, nb=ns and nc=ns separates the valid volume towards the origin from the invalid volume apart from the origin. The gradient of the limits in FIG. 8 is given by the packet quantities a, b and c.

This statistical approach is applicable, if
the vector R=(Ra, Rb, Rc) is time independent
an event (na,nb,nc) is independent from the previous one, e.g. it is memoryless and
the events a, b and c are assigned to quantities.

With this the three dimensional binomial distribution can be applied as follows:

$$p(na, nb, nc) = \frac{ns!}{na!nb!nc! * (ns-na-nb-nc)!} Ra^{na} Rb^{nb} Rc^{nc} (1-Ra-Rb-Rc)^{(ns-na-nb-nc)} \quad (11)$$

Wherein p(na,nb,nc) is the probability to find the event-vector ne=(na,nb,nc) in ns samples in a test object with true ratio R=(Ra,Rb,Rc)

It should be noted that $$3.1) \; na+nb+nc+\cancel{ne}=ns \quad (12)$$

There are four areas in FIG. 8 which can be distinguished:

3.2) In the valid volume of FIG. 8 (without boarders) the statistics with four outcomes na, nb, nc, $\cancel{ne}$ is applicable, where $\cancel{ne}$ is not independent.

3.3) On the boarder planes the statistics degenerates to a statistics with three outcomes.

3.4) On the boarder lines the statistics degenerates to a statistics with two outcomes.

3.5) On the edge points the total statistics degenerates into deterministics.

The target is to predict a certain throughput-threshold Tp in an experiment of ns samples, which, when hit by a real measurement, allows the following statement: The device under test is equal or better than the limit L with a probability of F (e.g. 95%). If actually measured we decide pass. We want to predict another threshold Tf in an experiment of ns samples, which, when hit by a real measurement, allows the following statement: The device under test is worse than the limit L with a probability of F. If actually measured we decide fail.

Those Tp and Tf can be found applying a series of three dimensional binomial distributions with true R on every point of limit L which is the even plane in FIG. 8. The following describes how to find one point of Tp. A three dimensional binomial distribution is erected onto one point of the limit. To perform the inverse cumulative operation, one starts at the origin and sum along even plains parallel to the limit. There is a last plane finalized with a sum below 95% in the example. The next plane ends up with a sum above 95%. We now discuss this plane. Among the probability-values on this plane there is a maximum. This is the wanted point of the Tp. There is no preference of the summation direction within one plane. There are several exclusive sets of straight stair case plains. They are interlaced.

The other points of Tp are constructed accordingly. In practice it is sufficient to construct a few points Tp and interpolate by a suitable method. The points of Tf are constructed accordingly. The result can be discussed as follows: The even plane L in FIG. 8 is the limit. The Tp planes are exclusively on one side of the limit, apart from the origin. For a short test the distance D to the limit is large. For a test ns→∞ the Tp plane approaches towards the limit D→0.

The Tp plane is for a $1^{st}$ approximation an even plane approximating parallel to the limit and for a $2^{nd}$ approximation an even plane not parallel to the limit. It is farer from the limit where Ra or Rb or Rc is nearer to ns/2. In a $3^{rd}$ approximation the plane is not even. Compared to the experiment with two outcomes the distance D of Tp to L is again smaller everywhere on the plain. We conclude, that the distance decreases more and more, for experiments with more outcomes.

The effects, found in the experiment with three outcomes, can be summarized as follows: Lower dimensional statistics can be used to find the Tp points on the boarder planes and lines. If the plane at limit L intersects the validity boarder, which is plane 17 in FIG. 8, then the wanted confidence level F cannot be achieved near the validity boarder 17. If the limit intersects the edge point, then Tp approaches the edge point.

Tf is exclusively on the other side of the limit, towards the origin. Otherwise it has the same properties. Tp is the pass limit; if a point on the Tp-plain or apart from the origin is measured in ns samples we decide pass. Tf is the fail limit; if a point on Tf-plain or towards the origin is measured in ns samples we decide fail. If the measurement is in between Tp and Tf in ns samples we cannot decide with the desired confidence level F.

Such pass and fail thresholds can be calculated for short tests (ns low) and long tests (ns high). Those thresholds approach the limit L the closer, the longer the test is, however never touch the limit completely.

Even if the pass and fail threshold can be calculated for short and long tests, it is only allowed to apply it at just one instant of the test, predefined by ns. This ns must be planned in advance to the test. Depending on R a possible outcome of a test may be undecided. In order to avoid this, a looser limit LL is established, e.g LL<L (< here means parallel towards the origin). The fail limit Tf remains unchanged and approaches L. The looser pass limit TLp approaches LL. This way the fail limit Tf based on L and the looser pass limit TLp based on LL intersect.

Using the $1^{st}$ approximation they intersect at a certain ns=nsInt. If the test is planned to last nsInt samples, an undecided result is not any more possible. Using the $2^{nd}$ or higher approximations the intersection is a line in the na-nb-nc-ns hyperspace.

Three areas of ns can be distinguished:

ns low: The undecided-region in the na-nb-nc-hyperspace divides the pass- and the fail-region completely.

ns middle: The undecided-region in the na-nb-nc-hyperspace divides the pass- and the fail-region partly. Otherwise the pass and fail region overlap.

ns high: there is no undecided-region. The first of those ns is called nsT.

If the test is planned to last nsT samples, an undecided result is not any more possible. It is the shortest test time excluding an undecided result. A pass means that the true T is better than LL with 95% confidence level in the example. A fail means that the true T is worse than L with 95% confidence level.

The invention is not limited to the examples and especially not to tests with two or three outcomes. The invention discussed above and can be applied to many test scenarios for radio channels and devices like mobile phone base stations and other equipment.

The invention claimed is:

1. Method for performing a statistical test on a device or radio channel, which has N outcomes in the form of N different events wherein N is higher than two, comprising:

measuring ns samples of the output of the device or radio channel under test, whereby occurs a specific number of each event, defining a specific limit for the test in a space spanned out by specific numbers of each event, erecting a N−1 dimensional likelihood distribution on several points of the limit, wherein the N−1 dimensional likelihood distribution is an N−1 dimensional binomial distribution, and constructing a threshold for fail of the radio channel or device and a threshold for pass of the radio channel or device by summing or integrating the N−1 dimensional likelihood distribution along unbroken paths parallel to the limit L until a predefined confidence level is reached, wherein the device or radio channel has three outcomes in the form of three different events and the two-dimensional binomial distribution $$p(na, nb) = \binom{ns}{na} Ra^{na} * \binom{ns-na}{nb} Rb^{nb} * (1 - Ra - Rb)^{(ns-na-nb)}$$

is used, wherein ns is the number of samples, na is the number of first events within the ns samples, nb is the number of second events within the ns samples, Ra is the true ratio of the occurrence of the first event to all events, Rb is the true ratio of the occurrence of the second event to all events, and p(na,nb) is the probability of the occurrence of na first events and nb second events.

2. Method according to claim 1, comprising transmitting packets with N−1 different data quantities through the device or radio channel, wherein N−1 events are the reception of a packet with a specific one of the different data quantities and the $N^{th}$ event is the loss of a packet.

3. Method according to claim 1, comprising transmitting packets with two different data quantities through the device or radio channel wherein the first event is the reception of a packet with the first data quantity, the second event is the reception of a packet with the second data quantity, and the third event is the loss of a packet.

4. Method according to any of claim 1, comprising constructing the thresholds for fail and pass only for a few points of the limit and interpolating between the thresholds of these points.

5. Method according to claim 1, comprising starting the summing or integrating from the origin.

6. Method for performing a statistical test on a device or radio channel, which has N outcomes in the form of N different events wherein N is higher than two, comprising:

measuring ns samples of the output of the device or radio channel under test, whereby occurs a specific number of each event, defining a specific limit for the test in a space spanned out by specific numbers of each event, erecting a N−1 dimensional likelihood distribution on several points of the limit, wherein the N−1 dimensional likelihood distribution is an N−1 dimensional binomial distribution, and constructing a threshold for fail of the radio channel or device and a threshold for pass of the radio channel or device by summing or integrating the N−1 dimensional likelihood distribution along unbroken paths parallel to the limit L until a predefined confidence level is reached, wherein the device or radio channel has four outcomes in the form of four different events and the three-dimensional binomial distribution $$p(na, nb, nc) = \frac{ns!}{na!nb!nc!*(ns-na-nb-nc)!} Ra^{na} Rb^{nb} Rc^{nc} (1-Ra-Rb-Rc)^{(ns-na-nb-nc)}$$

is used, wherein
ns is the number of samples,
na is the number of first events within the ns samples,
nb is the number of second events within the ns samples,
nc is the number of third events within the ns samples,
Ra is the true ratio of the occurrence of the first event to all events,
Rb is the true ratio of the occurrence of the second event to all events,
Rc is the true ratio of the occurrence of the third event to all events, and
p(na,nb,nc) is the probability of the occurrence of na first events, nb second events and nc third events.

7. Method according to claim 6, comprising transmitting packets with N−1 different data quantities through the device or radio channel, wherein N−1 events are the reception of a packet with a specific one of the different data quantities and the $N^{th}$ event is the loss of a packet.

8. Method according to any of claim 6, comprising constructing the thresholds for fail and pass only for a few points of the limit and interpolating between the thresholds of these points.

9. Method according to claim 6, comprising starting the summing or integrating from the origin.

* * * * *